(12) United States Patent
Charlier et al.

(10) Patent No.: US 7,957,772 B2
(45) Date of Patent: Jun. 7, 2011

(54) APPARATUS AND METHOD FOR DELAYED ANSWERING OF AN INCOMING CALL

(75) Inventors: Michael L. Charlier, Palatine, IL (US); Mark R. Braun, Elgin, IL (US); Judy Jeong Ma, Long Grove, IL (US); Arnold Sheynman, Northbrook, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 416 days.

(21) Appl. No.: 12/259,385

(22) Filed: Oct. 28, 2008

(65) Prior Publication Data
US 2010/0105446 A1    Apr. 29, 2010

(51) Int. Cl.
*H04M 1/00* (2006.01)
(52) U.S. Cl. .......... 455/569.1; 455/567; 379/41
(58) Field of Classification Search .......... None
See application file for complete search history.

(56) References Cited

U.S. PATENT DOCUMENTS

| | | | |
|---|---|---|---|
| 6,018,671 A | 1/2000 | Bremer | |
| 6,307,929 B1 | 10/2001 | Baiyor et al. | |
| 6,324,263 B1 | 11/2001 | Sherwood et al. | |
| 6,631,188 B1 | 10/2003 | Sands | |
| 7,010,288 B2 | 3/2006 | Brown et al. | |
| 7,016,707 B2 | 3/2006 | Fujisawa et al. | |
| 7,106,852 B1 | 9/2006 | Nelson et al. | |
| 7,231,232 B2 | 6/2007 | Osann, Jr. | |
| 7,251,470 B2 | 7/2007 | Faucher et al. | |
| 2002/0188670 A1 | 12/2002 | Stringham | |
| 2005/0153729 A1 | 7/2005 | Logan et al. | |
| 2007/0127704 A1 | 6/2007 | Marti et al. | |
| 2007/0155313 A1* | 7/2007 | Goldberg et al. | 455/3.06 |
| 2009/0186639 A1* | 7/2009 | Tsai | 455/466 |
| 2010/0240307 A1* | 9/2010 | Sims et al. | 455/41.3 |

OTHER PUBLICATIONS http://64.233.167.104/search?q=cacgeL__/VVWdwjjfl8J:www.halfbakery.com/idea/Caller_2...;dated Aug. 28, 2007; Halfbakery: Caller ID Answering Machine; Caller ID Answering Machine; pp. 1-3.
http://del.icio.us/url/f0f5b14a1521483dbf059283d6fb3216; dated Aug. 27, 2007 del.icio.us/url; pp. 1-6.

* cited by examiner

*Primary Examiner* — Ajit Patel

(57) ABSTRACT

A wireless hands-free device is operable to communicate with a mobile communication device over a short-range wireless link. The hands-free device includes a transceiver, a memory, a delayed answering mode actuator (DAMA), and a processing device. The transceiver is operable to receive incoming call information from the mobile device over the short-range link. The incoming call information corresponds to an incoming call received by the mobile device over a wireless wide area network. The memory is operable to store one or more pre-recorded audio messages. The DAMA is activatable by a user of the hands-free device. The processing device is operable to: detect activation of the DAMA after receipt of the incoming call information, retrieve at least one pre-recorded audio message responsive to detecting activation of the DAMA, and provide the retrieved, pre-recorded audio message(s) to the transceiver for subsequent transmission to the mobile device over the short-range link.

21 Claims, 3 Drawing Sheets

APPARATUS AND METHOD FOR DELAYED ANSWERING OF AN INCOMING CALL

FIELD OF THE INVENTION

The present invention relates generally to wireless communication networks and, more particularly, to an apparatus and method for facilitating delayed answering of an incoming call originating from such a network.

BACKGROUND

Use of wireless headsets and other types of hands-free devices are well known. Such devices typically operate according to short-range wireless protocols, such as the BLUETOOTH protocol, and are wirelessly connected to a separate mobile communication device, such as a mobile telephone. When a call is received by the mobile communication device over its associated wireless wide area network (WWAN) and the mobile device is wirelessly connected to a hands-free device, the call is demodulated to extract the embedded voice information and the hands-free device is alerted of the call according to the short-range wireless protocol. If the user of the hands-free device decides to answer the call, the user typically presses a button on the hands-free device to indicate to the mobile device that the call is to be answered and forwarded to the hands-free device. Responsive to receiving an indication that the call is to be answered (e.g., via a BLUETOOTH hands-free or headset profile command), the mobile device transmits the audio packets to the hands-free device according to the short-range wireless protocol, where they are subsequently demodulated, decoded, and audibly provided to one or more speakers in the hands-free device.

While hands-free devices allow users to participate in calls and otherwise interact with mobile devices without having to hold the mobile devices to their ears, the hands-free devices still require the users to speak in order to participate in calls. Such speaking may be disruptive or disrespectful depending upon the circumstances under which an incoming call may be received. For example, a user may be in a meeting or another area in which the user does not want to immediately talk when receiving a call because the conversation may disrupt others. However, the user wants to answer the call, but would like to postpone talking until the user is in an area that is more conducive to a conversation. Typically, under these circumstances, the user presses the answer button on the hands-free device and then whispers to the caller to wait a minute for the user to leave the area. While this approach attempts to minimize the length of time of the disruption, it does not eliminate the disruption and persons in the user's immediate vicinity are bothered, at least temporarily, when the user answers the call. On the other hand, if the user answers the call by depressing the answer or on-hook button of the hands-free device and does not say anything, the caller may be confused and think that the call was disconnected, resulting in the caller hanging up.

Previous attempts have been made to provide a silent call feature that permits the delayed answering of a call. Once such attempt is described in U.S. Pat. No. 6,018,671 ("the '671 patent"). According to the '671 patent, one or more pre-recorded audio messages are stored in the mobile communication device and transmitted to a calling party when the user of the mobile device places the mobile device into a non-active state responsive to receiving an incoming call. The pre-recorded messages inform the caller that the mobile device user is occupied, but will answer the call shortly. One or more of the messages can be repeatedly played to the caller until the mobile device user places the call in an active state and participates in the call. While the silent call feature disclosed in the '671 patent allows the user to defer answering a call without disrupting others and while simultaneously informing the caller of the user's current circumstances, the feature is tied to the mobile communication device and is not associated with a hands-free device. As a result, a user of a hands-free device would be required to keep the mobile communication device at close range in order to activate the silent call feature on the mobile device when necessary, which may reduce the benefit of utilizing a hands-free device. Additionally, because the silent call feature is implemented in the mobile communication device, the user would lose the feature when, for example, the user had to borrow or rent a BLUETOOTH or other hands-free capable mobile device that did not include the silent call feature (e.g., when traveling to a country that did not support the wireless technology utilized by the user's own mobile device).

Another attempt at providing a quiet or silent call is disclosed in U.S. Pat. No. 7,106,852 ("the '852 patent"). According to the '852 patent, a mobile telephone stores several conversation elements representing audible utterances that could be made during a conversation. When a user wants to have a quiet conversation, the user uses a mechanical device, such as a stylus, to select a displayed conversation element that corresponds to one or more words to be used in the conversation. Upon selection of the conversation element, the mobile telephone transmits an audio message or utterance corresponding to the conversation element to the other party. Thus, by selecting multiple conversation elements, the mobile telephone user can audibly communicate with the other party without ever speaking. While the quiet call feature disclosed in the '852 patent facilitates quiet communications, the feature is similarly tied to the mobile communication device and is not associated with a hands-free device. As a result, a user of a hands-free device would be required to hold the mobile communication device or at least keep it at close range in order to utilize the quiet call feature, which may reduce the benefit of utilizing a hands-free device. Additionally, because the quiet call feature is implemented in the mobile communication device, the user would lose the feature when, for example, the user had to borrow or rent a mobile device that did not include such a feature (e.g., when traveling to a country that did not support the wireless technology utilized by the user's own mobile device). Further, if the quiet call feature resides on the mobile communication device, an additional communication protocol would need to be in both the hands-free device and the mobile communication device to initiate or cancel the feature from the hands-free device. Such a protocol would be a non-standard proprietary protocol or a new standardized protocol. As a result, the quiet call feature would not be available for legacy mobile devices that do not include the necessary protocol.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
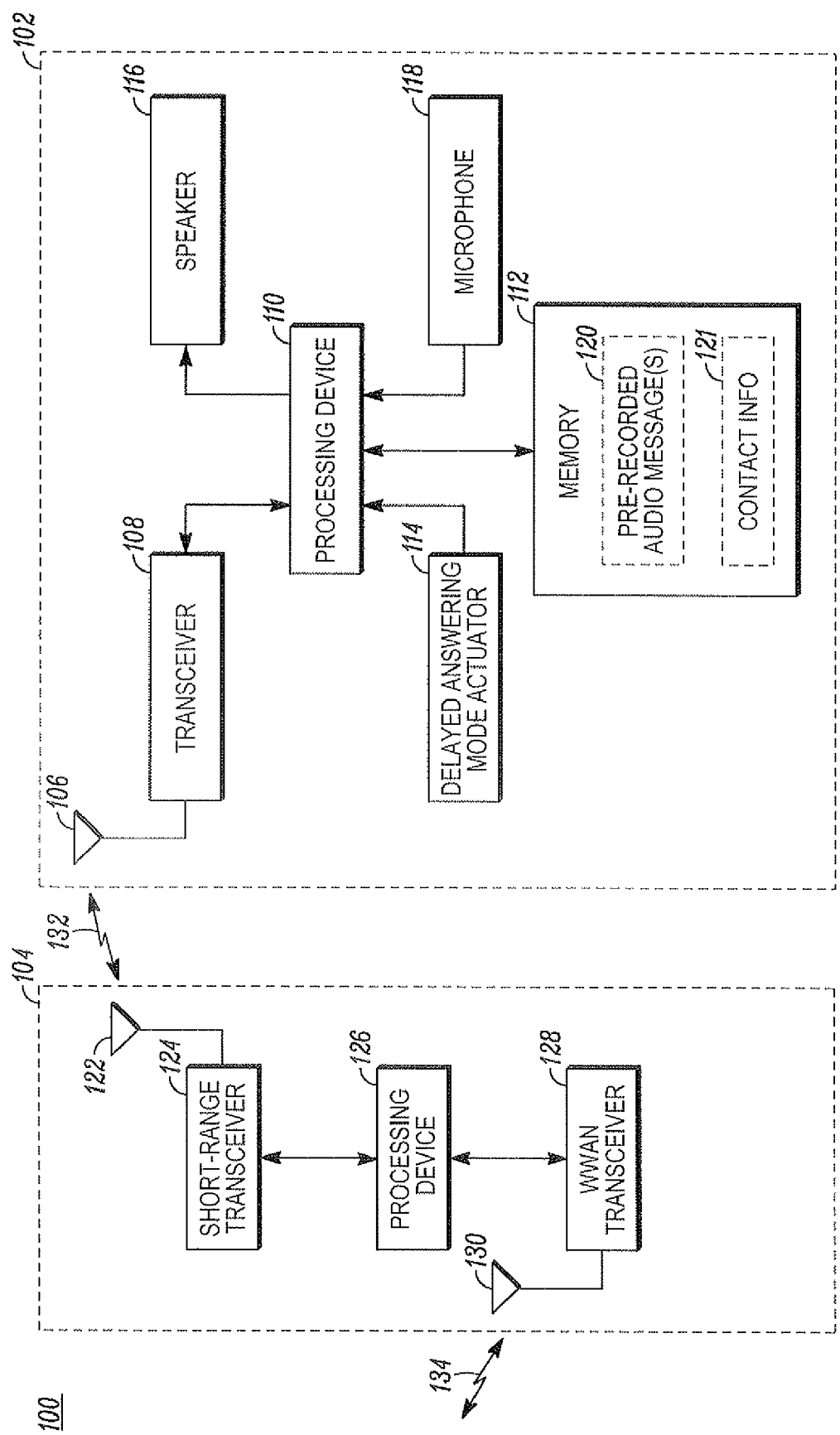
FIG. 1 is an electrical block diagram of a system for providing delayed answering of an incoming call in accordance with an exemplary embodiment of the present invention.

Skilled artisans will appreciate that elements in the figures are illustrated for simplicity and clarity and have not necessarily been drawn to scale. For example, the dimensions of some of the elements in the figures may be exaggerated alone or relative to other elements to help improve the understanding of the various embodiments of the present invention.

DETAILED DESCRIPTION

Generally, the present invention encompasses an apparatus and method for facilitating delayed answering of an incoming call. In one embodiment, a wireless hands-free device (e.g., a wireless headset, earpiece, or ear bud) is operable to communicate with a mobile communication device (e.g., a mobile telephone or a multi-purpose device with mobile telephone functionality) over a short-range wireless link, such as a wireless link implementing the BLUETOOTH wireless protocol, which provides wireless communications over a distance range of approximately ten meters or less. In accordance with an exemplary embodiment of the present invention, the wireless hands-free device includes, inter alia, a transceiver, a memory, a delayed answering mode actuator, and a processing device. The transceiver is operable to at least receive incoming call information from the mobile communication device over the short-range wireless link. The incoming call information corresponds to an incoming call received by the mobile communication device over a wireless wide area network (WWAN), such as a wireless mobile telephone network. The memory is operable to store one or more pre-recorded audio messages, such as one or more personalized greeting or status messages and/or one or more non-personalized or canned messages. The delayed answering mode actuator is accessible by a user of the wireless hands-free device.

The processing device, which is operably coupled to the transceiver, the memory, and the delayed answering mode actuator, is operable to detect activation of the delayed answering mode actuator by the user after receipt of the incoming call information. The processing device is also operable to retrieve at least one pre-recorded audio message from the memory responsive to detecting activation of the delayed answering mode actuator and to provide the retrieved, pre-recorded audio message(s) to the transceiver for subsequent transmission to the mobile communication device over the short-range wireless link. The mobile communication device then transmits the pre-recorded audio message to the calling party (i.e., the sender of the incoming call) via the WWAN. Transmission of the pre-recorded message allows the user to virtually answer and continue the call until the user can move to a location in which he or she can personally participate in the call.

Through use of a wireless hands-free device with the aforementioned functionality, or a system that includes such a wireless hands-free device together with the mobile communication device, the present invention enables the user to delay his or her live answering of an incoming call until the user can relocate to an area more conducive to verbal conversation, while providing the calling party with information sufficient to inform the calling party that the user will be answering the call shortly. In other words, the apparatus and method of the present invention function to place the incoming call on a virtual hold in which the caller is informed of the status of the called party through conveyance of one or more pre-recorded messages. Additionally, the present invention provides for storage of the pre-recorded messages in the wireless hands-free device to enable the delayed answering functionality to be used with any mobile communication device capable of operating with the hands-free device according to a short-range wireless protocol, such as the BLUETOOTH headset or hands-free profile.

Figure 2:
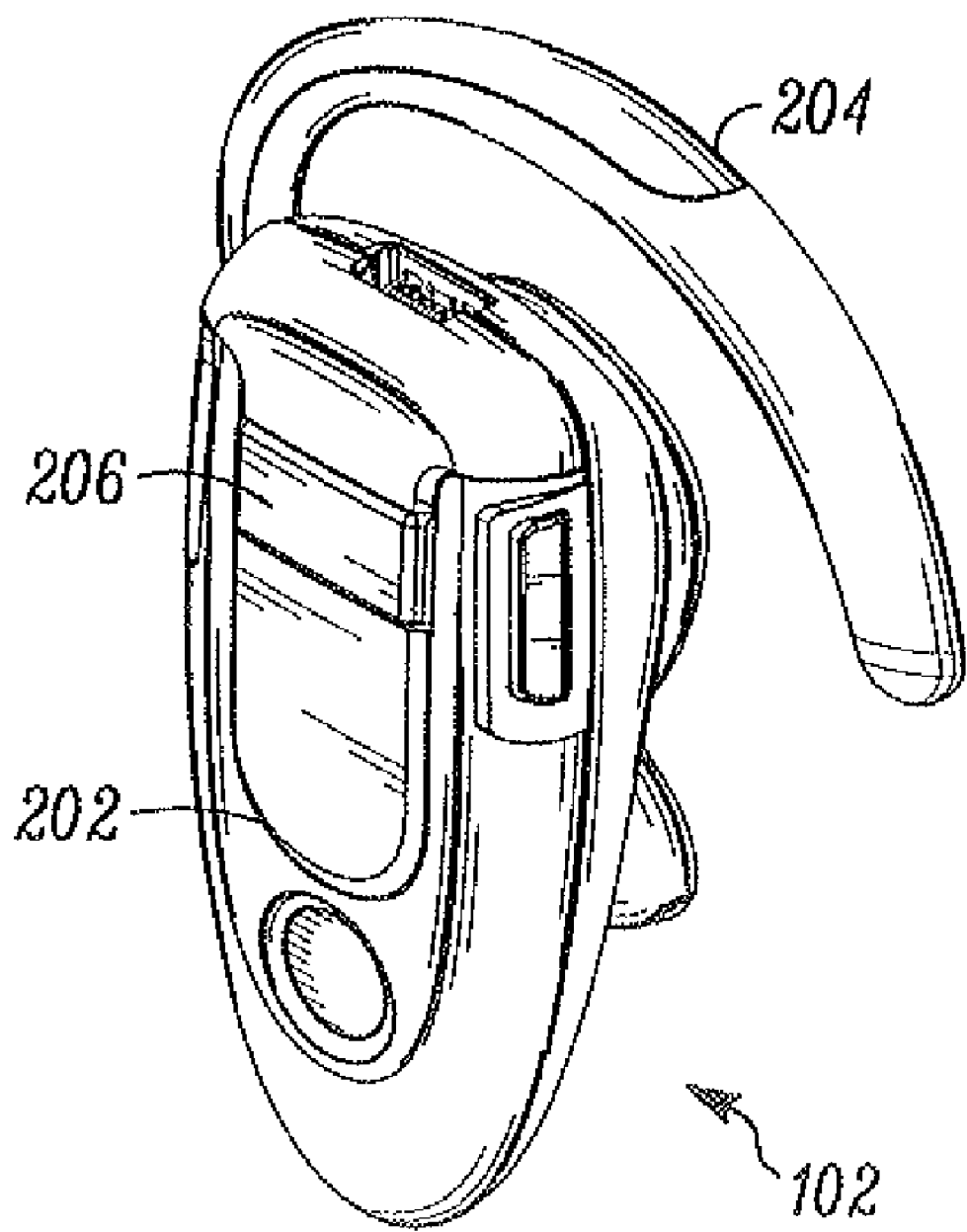
FIG. 2 is a perspective view of a hands-free device that can be used in the exemplary system of FIG. 1.
Figure 3:
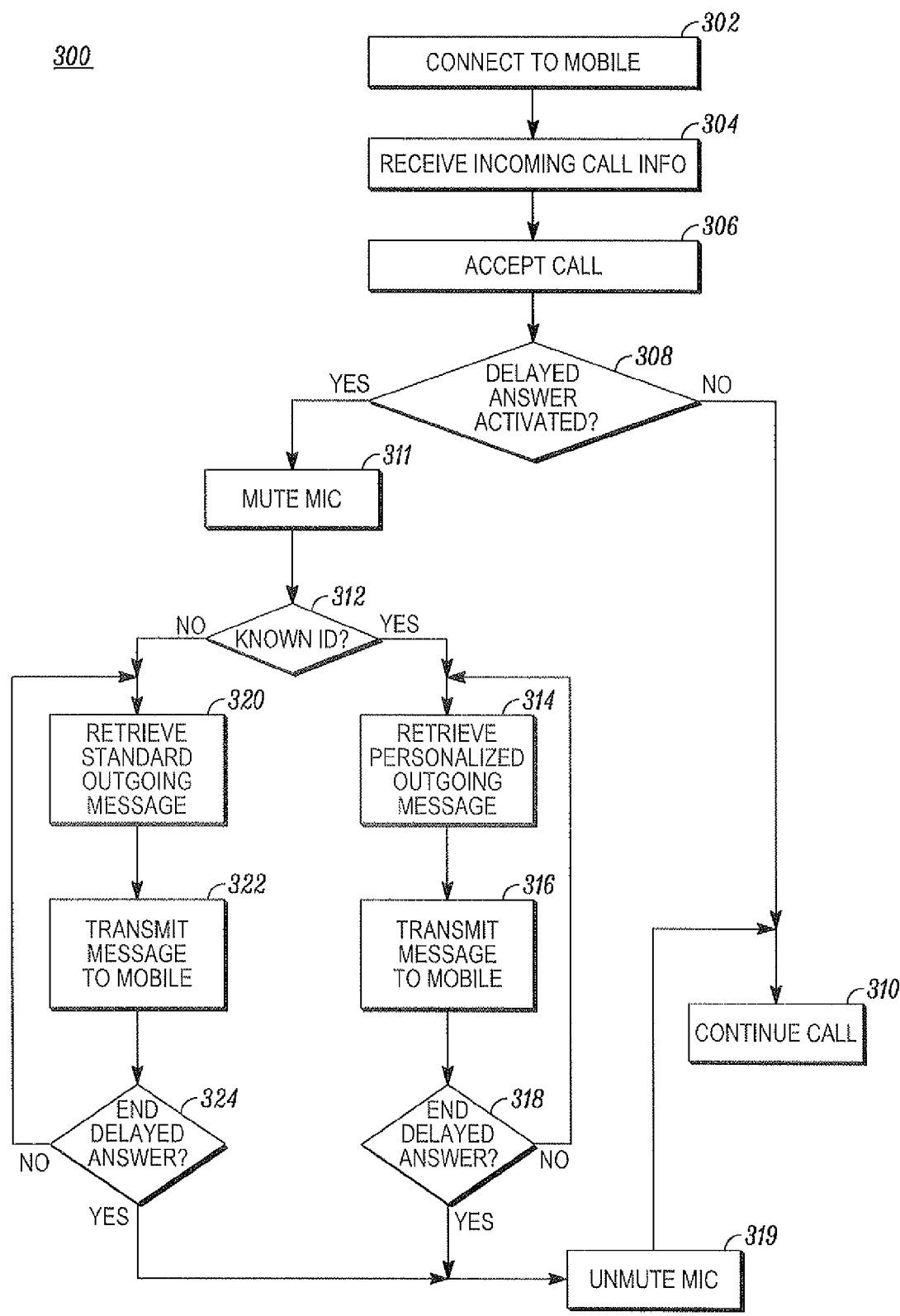
FIG. 3 is a flow diagram of steps executed by a wireless hands-free device to facilitate delayed answering of an incoming call in accordance with an exemplary embodiment of the present invention.

Embodiments of the present invention can be more readily understood with reference to FIGS. 1-3, in which like reference numerals designate like items. FIG. 1 is an electrical block diagram of a system 100 for providing delayed answering of an incoming call in accordance with an exemplary embodiment of the present invention. The exemplary system 100 includes a wireless hands-free device 102 and a mobile communication device 104. The hands-free device 102 includes, inter alia, an antenna 106, a transceiver 108 or other transmitting and receiving capability, a processing device 110, memory 112, a delayed answering mode actuator 114, one or more speakers 116 (one shown), and one or more microphones 118 (one shown). The hands-free device 102 may also include a display, a power source (e.g., a battery), a battery-charging circuit, audio volume controls, and other conventional elements as are well understood in the art. In one embodiment, the hands-free device 102 may be a wireless headset, ear piece or ear bud. Alternatively, the hands-free device 102 may be a cordless headset, an in vehicle hands-free device, a wireless speakerphone, a sensory call notifier (non-audio device), a DECT™ headset, or a voice over Internet Protocol (VoIP) headset. Still further, the hands-free device 102 may be incorporated into a stereo headset, in which case the hands-free device 102 may include two or more speakers. The hands-free device 102 may further include noise cancellation capability and include a second microphone (not shown), as is well understood in the art.

The antenna 106, the transceiver 108, and the signal processing functions of the processing device 110 are designed to implement and support a shorter-range wireless protocol, such as Wi-Fi (IEEE 802.11), BLUETOOTH, Zigbee, Ultra Wide-Band (e.g., IEEE 802.15.4a draft standard), or a proprietary protocol, operating to communicate digital information, such as audio, control information, and other data, between the hands-free device 102 and the mobile communication device 104 over a short-range wireless link 132. As is well understood by those skilled in the art, the transceiver 108 integrates both transmit and receive functionality. Alternatively, a separate transmitter and receiver (not shown) may be used in place of the transceiver 108.

The processing device 110 is coupled to the transceiver 108, the memory 112, the delayed answering mode actuator 114, the speaker 116, and the microphone 118. The processing device 110 utilizes conventional signal-processing techniques for processing communication signals received over the short range link 132 and intended for transmission over the short range link 132. The processing device 110 can be a microprocessor, a microcontroller, a digital signal processor (DSP), a state machine, logic circuitry, or any other device or combination of devices that processes information based on operational or programming instructions stored in the memory 112. One of ordinary skill in the art will appreciate that the processing device 110 can be implemented using multiple processors as may be required to handle the processing requirements of the present invention and the various other included functions of the hands-free device 102. One of ordinary skill in the art will further recognize that when the processing device 110 has one or more of its functions performed by a state machine or logic circuitry, the memory containing the corresponding operational instructions can be embedded within the state machine or logic circuitry as opposed to being external to the processing device 110.

In one embodiment, the memory 112 stores, inter alia, one or more pre-recorded audio messages 120, optional contact information 121, and one or more applications (not shown) executed by the processing device 110 during operation of the hands-free device 102. The memory 112, which may be a separate element as depicted in FIG. 1 or integrated into the processing device 110, can include random access memory (RAM), read-only memory (ROM), FLASH memory, electrically erasable programmable read-only memory (EEPROM), removable memory, and/or various other forms of memory as are well known in the art. It will be appreciated by one of ordinary skill in the art that the various memory components can each be a group of separately located memory areas in the overall or aggregate device memory and that the device memory may include one or more individual memory elements.

In one embodiment, the stored audio messages 120 include a plurality of pre-recorded audio messages intended to provide a calling party with the system user's status in connection with answering a call placed by the calling party. For example, one stored message 120 may inform the calling party that the system user would like to answer the call, but cannot do so at the moment and is moving to an area where he or she can take the call. Another stored message 120 may ask the calling party to continue holding while the system user relocates to an area where the call can be continued. The stored messages 120 may be personalized (e.g., recorded by the system user) or non-personalized (e.g., canned, standard, or factory produced) and may be played individually or as a series as described in more detail below.

The contact information 121 may be any information that would enable the processing device 110 to recognize a caller and is passable from the mobile communication device 104 to the hands-free device 102 according to the selected shorter-range wireless protocol. Accordingly, the contact information 121 may be information such as telephone numbers, group or dispatch identifications (IDs), Internet Protocol (IP) addresses, uniform resource locators (URLs), uniform resource identifiers (URLs), and/or contact names.

The applications component of the memory 112 includes one or more applications for controlling communication over the short-range wireless link 132 using the shorter-range protocol. Accordingly, the applications component of the memory 112 may include a protocol stack for controlling the transfer of information generated by the processing device 110 over the short-range wireless link 132. In one embodiment, the short-range wireless link 132 facilitates wireless communication over a range of approximately ten meters or less. Alternatively, the short-range wireless link 132 may be configured to facilitate wireless communication up to a range of approximately one hundred meters.

The delayed answering mode actuator 114 may be implemented using a manually actuated switch coupled to a keypad or button accessible by the user of the system 100. In one embodiment, the delayed answering mode actuator 114 is implemented as the conventional manually actuated button switch used for accepting a call at the hands-free device 102, with the exception that the processing device 110 recognizes a predetermined pattern of actuation of the switch to distinguish between the user's desire to answer an incoming call and the user's desire to activate a delayed answering (e.g., an answer and hold) mode of operation. For example, the processing device 110 may be programmed to recognize that a single press and release of the switch corresponds to the user's desire to answer the incoming call; whereas, another press pattern, such as press once and hold for a predetermined period of time (e.g., more than one second), press and release a predetermined number of times in succession (e.g., twice), or press and release a predetermined number of times (e.g., twice) and then hold on a last, press for a predetermined period of time (e.g., more than one second), would signify the user's intention to activate the delayed answering mode of operation as detailed below. Of course, one skilled in the art will readily recognize that various other switch actuation patterns may be used to distinguish between answering an incoming call normally and placing the hands-free device 102 in the delayed answering mode of operation. In an alternative embodiment, a separate button switch (i.e., one separate from the button switch used to answer a call on a conventional hands-free device) may be used to implement the delayed answering mode actuator 114. In this case, the hands-free device 102 would include two manually actuatable button switches or equivalent selectors (e.g., touch pads, heat sensors, infrared sensors, optical sensors, and the like)—one for answering the incoming call normally and the other for activating the delayed answering mode of operation.

The speaker 116 and the microphone 118 are conventional components that are well understood in the art. The hands-free device 102 also includes appropriate driver circuitry for the speaker and the microphone, which circuitry may be included as part of the processing device 110. Operation of the speaker 116 and the microphone 118 are controlled by the processing device 110 in accordance with the present invention as detailed below.

The mobile communication device 104 includes, inter alia, a short-range antenna 122, a short-range transceiver 124, a processing device 126, a wireless wide area network (WWAN) transceiver 128, and a WWAN antenna 130. The short-range antenna 122, the short-range transceiver 104 and various signal processing functions of the processing device 126 are designed to implement and support a shorter-range wireless protocol, such as Wi-Fi, BLUETOOTH, Zigbee, Ultra Wide-Band, or a proprietary protocol, operating to communicate information, such as audio, control information, and data, between the hands-free device 102 and the mobile communication device 104. Accordingly, the short-range antenna 122 and the short-range transceiver 124 of the mobile communication device 104 are analogous to the antenna 106 and the transceiver 108 of the hands-free device 102.

As is well known, the mobile communication device 104 may optionally include various other components, such as memory, a user interface, a display, and an alert circuit, just to name a few. As is also well understood by those skilled in the art, the short-range and WWAN transceivers 124, 128 integrate both transmit and receive functionality. Alternatively, separate transmitters and receivers (not shown) may be respectively used in place of the short-range and WWAN transceivers 124, 128.

The processing device 126 is coupled to the short-range transceiver 124, the WWAN transceiver 128, memory (not shown), and, when included, the user interface, the display, and the alert circuit. The processing device 126 utilizes conventional signal-processing techniques for processing communication signals received over the short range link 132 or the WWAN link 134 and for processing communication signals intended for transmission over the short range link 132 or the WWAN link 134, The processing device 126 can be a microprocessor, a microcontroller, a DSP, a state machine, logic circuitry, or any other device or combination of devices that processes information based on operational or programming instructions stored in memory. One of ordinary skill in the art will appreciate that the processing device 126 can be implemented using multiple processors as may be required to handle the processing requirements of the present invention and the various other included functions of the mobile communication device 104. One of ordinary skill in the art will further recognize that when the processing device 126 has one or more of its functions performed by a state machine or logic circuitry, the memory containing the corresponding operational instructions can be embedded within the state machine or logic circuitry as opposed to being external to the processing device 126.

To perform the necessary functions of the mobile communication device 104, the processing device 126 may be coupled to memory (not shown), which can include RAM, ROM, FLASH memory, EEPROM, removable memory (e.g., a subscriber identification module (SIM) card), a hard drive, and/or various other forms of memory as are well known in the art. In one embodiment, the memory may include several memory components, including, but not limited to, an address component and an applications component. It will be appreciated by one of ordinary skill in the art that the various memory components can each be a group of separately located memory areas in the overall or aggregate device memory and that the device memory may include one or more individual memory elements.

The address component of the memory stores the address or addresses that uniquely identify the mobile communication device 104. For example, the address component can include the device's international mobile subscriber identification (IMSI), international mobile equipment identity (IMEI), telephone number, group identification, IP address, medium access control (MAC) address, and so forth.

The applications component of the mobile device memory stores applications to be executed by the processing device 126. The stored applications may include one or more applications for accessing services on a services network hosted, operated or controlled by a mobile network operator (MNO) that operates or controls the WWAN. Such MNO service applications, which may include, for example, short message service (SMS), WWAN voice service (e.g., voice-over-IP (VoIP) service), multimedia messaging service (MMS), IP multimedia service (IMS), instant message and/or email service, and wireless application protocol (WAP) service, generate data intended for communication over the WWAN link 134 when executed by the processing device 126. The stored applications also include applications that generate data intended for communication over the short-range link 132 to the hands-free device 102 when executed by the processing device 126. The stored applications may further include one or more applications for accessing services on a public IP services network, such as the Internet.

The communications standard or protocol of the WWAN over which the WWAN transceiver 130 communicates may be any conventional protocol or multiple access technique, including, without limitation, Code Division Multiple Access (CDMA), Wideband CDMA, Time Division Multiple Access (TDMA), Global System for Mobile Communications (GSM), Enhanced Data GSM Environment (EDGE), General Packet Radio Service (GPRS), Frequency Division Multiple Access (FDMA), Orthogonal Frequency Division Multiplexing (OFDM), spread spectrum, or any other known or future developed access or link protocol or methodology. Additionally, the WWAN may further utilize text messaging standards, such as, Short Message Service (SMS), Enhanced Messaging Service (EMS), Multimedia Messaging Service (MMS), or any other future developed standard or proprietary data transmission protocol, to communicate textual, graphic and video data between the mobile communication device 104 and a base station (not shown) over a corresponding WWAN link 134. The WWAN may further allow for push-to-talk over cellular or group communications between capable wireless communication devices.

The WWAN can further use any of a variety of networking protocols, such as, for example, User Datagram Protocol (UDP), Transmission Control Protocol/Internet Protocol (TCP/IP), AppleTalk™, Inter-Packet Exchange/Sequential Packet Exchange (IPX/SPX), Network Basic Input. Output System (Net BIOS), or any proprietary or non-proprietary protocol, to communicate digital voice, text, graphics, and/or video (collectively, "data"). Additionally, the WWAN can be connected to one or more wide area networks, such as the Internet and/or the public switched telephone network, or a private customer enterprise network (CEN).

The mobile communication device 104 may be implemented as a mobile telephone, a smart phone, a text messaging device, a handheld computer, a wireless communication card, a PDA, a notebook or laptop computer, or any other wireless communication device that has been modified or fabricated to include the functionality of the present invention. A smart phone is a mobile telephone that has additional application processing capabilities. For example, in one embodiment, a smart phone is a combination of 1) a pocket personal computer (PC), handheld PC, palm top PC, or PDA, and 2) a mobile telephone. A wireless communication card, in one embodiment, resides or is insertable within a PC or a laptop computer. The term "mobile communication device" is intended to broadly cover many different types of devices that can receive and/or transmit signals and that can operate in a wireless communication system. For example, and not by way of limitation, a mobile communication device can include any one or a combination of the following: a cellular telephone, a mobile phone, a smart phone, a two-way radio, a two-way pager, a wireless messaging device, a laptop/computer, an automotive gateway, a residential gateway, a personal computer, a server, a PDA, a router, a cordless telephone, a wireless email device, a portable gaming device including a built-in wireless modem, and the like.

In accordance with some embodiments of the present invention, the mobile communication device 104 has one or more addresses or identities assigned thereto to enable the mobile communication device 104 to identify and process communication signals intended for it and to provide an indicator of source for communication signals transmitted by it. For example, prior to participating in communications over the WWAN link 134, the mobile communication device 104 is provisioned for operation over a WWAN by the licensed network operator of the WWAN. Such provisioning is well-known in the art and includes, for example, assigning the mobile communication device 104 a network identifier, such as a telephone number, otherwise configuring the mobile communication device 104 for operation in the WWAN, and setting up billing processes. Prior to such provisioning, the mobile communication device 104 is provisionable on any WWAN that operates using the wireless communication protocol for which the WWAN transceiver 128 was designed. Upon the mobile communication device 104 receiving a signal over either the short range link 132 or the WWAN link 134, the processing device 126 decodes an address in the demodulated data of the received signal, compares the decoded address with one or more addresses stored in an address memory component of the overall device memory, and, when the received address correlates substantially with an address stored in the address memory component, proceeds to process the remaining portion of the received signal.

FIG. 2 depicts a perspective view of an exemplary wireless hands-free device 102 in accordance with the present invention. In this embodiment, the hands-free device 102 includes a housing 202 connected to a mechanism 204 for securing the housing 202 proximate the user's ear. The delayed answering mode actuator 134 is implemented in this embodiment as a manually actuatable call answering button 206 or switch, which passes through an appropriately-sized aperture in the housing 202. Thus, in this case, delayed answering would be accomplished by the user's pressing of the call answering button 206 in a predetermined manner (e.g., press twice or press and hold) to distinguish actuation of the delayed answering mode from normal call answering. Alternatively, the delayed answering mode actuator 114 may be implemented as a second button (not shown) separated along a length of the housing 202 from the call answering button 206 or at any other location about a periphery of the housing 202.

Operation of the exemplary wireless system 100 occurs substantially as follows in accordance with the present invention. Operation of the system 100 will be described for the case in which the shorter-range wireless protocol is the BLUETOOTH protocol. However, as detailed above, any known or future developed shorter-range wireless protocol may be used for communication between the hands-free device 102 and the mobile device 104.

Initially, the hands-free device 102 and the mobile communication device 104 are powered on and associated with one another in accordance with the BLUETOOTH protocol. Subsequently, an incoming call is received over the WWAN link 134 by the mobile device's WWAN antenna 130 and WWAN transceiver 128 in a conventional manner. The mobile device's processing device 126 processes the incoming call in accordance with known techniques and generates incoming call information based thereon. The incoming call information may consist of a call notification message or may further include calling party identification (ID) information, such as the calling party's telephone number (optionally including the corresponding country code), private call number, group or dispatch identification, IP address, or any other information identifying the calling party. The processing device 126 forwards the incoming call information to the short-range transceiver 124 in a hands-free profile message, which in turn transmits the message to the hands-free device 102 over the short-range link 132 in accordance with the BLUETOOTH protocol. The processing device 126 may also activate an alerting circuit in the mobile device 104, such as a speaker or vibration device, to notify the system user that a call has been received.

The message containing the incoming call information is received by the hands-free device's antenna 106 and transceiver 108. The transceiver 108 provides the received message to the hands-free device's processing device 110, which extracts the contents of the message in accordance with known techniques. In one embodiment, the hands-free device's memory 112 may store contact information 121 entered by the user or transferred from a memory of the mobile communication device 104 to the memory 112 of the hands-free device 102 prior to receipt of the incoming call information. Additionally, the hands-free device's processing device 110 may include a text-to-speech converter. The text-to-speech converter may be used to convert a textual identifier (e.g., name, nickname, telephone number, and so forth) stored in the user-defined contact information 121 and corresponding to the calling party as identified in the incoming call information to an audio caller ID that is played to the user via the speaker 116. In other words, the processing device 110 may include appropriate text-to-speech or other functionality sufficient to process at least some of the calling party ID information, or stored contact information corresponding to the calling party ID information, into a format deliverable by the speaker 116 such that the speaker 116 can audibly deliver such information to the system user. Such an audio caller ID allows the user to identify the caller and decide whether to answer the call or actuate the delayed answering feature.

Alternatively, in another embodiment in which the mobile device 104 includes voice activation functionality, the mobile device's processing device 126 may retrieve a pre-stored audio identifier from the mobile device's contact information memory (not shown) based upon the calling party ID contained in the incoming call and transmit the audio identifier to the hands-free device 102 as part of the incoming call information. In such a case, the processing device 110 of the hands-free device 102 may play the received audio identifier to the user through the speaker 116 as an audio caller ID feature.

After receiving the incoming call information and optionally providing an audio caller ID, the processing device 110 detects whether the delayed answering mode actuator 114 has been activated indicating the user's intent to actuate the delayed answering mode of operation. Such a determination may be made by detecting whether the call answering button 206 has been pressed or otherwise actuated in a predetermined manner or whether a separate delayed answer button or switch has been pressed or otherwise actuated.

In the event that the processing device 110 detects activation of the delayed answering mode actuator 114, the processing device 110 retrieves one or more pre-recorded audio messages 120 stored in the memory 112 and provides the pre-recorded message 120 in the form of hands-free profile uplink audio to the transceiver 108, which in turn transmits the pre-recorded message over the short-range link 132 to the mobile device's short-range transceiver 124 for subsequent transmission by the mobile device 104 over the WWAN link 134 to the calling party. The processing device 110 may also mute any sound detected by the microphone 118 responsive to detecting activation of the delayed answering mode actuator 114 so that extraneous sounds produced by the system user or the user's environment are prevented from being communicated to the mobile device 104 together with, or instead of, the pre-recorded message 120. In one embodiment, the pre-recorded audio message 120 informs the calling party that the system user is currently unavailable and requests that the calling party hold until the user can move to a location more conducive to speaking.

In an alternative embodiment, the hands-free device memory 112 may store multiple pre-recorded audio messages 120. The stored messages 120 may be personalized (e.g., recorded by the user) and/or non-personalized (e.g., pre-stored during manufacturing of the hands-free device 102). Personalized messages may be recorded by the user by activating a record mode in the processing device 110 (e.g., by pressing the call answering button 206 in a predetermined manner that is distinct from the manner used to answer an incoming call or to actuate the delayed answering mode) and speaking the message into the microphone 118. Alternatively, personalized messages may be spoken into a microphone (not shown) of the mobile communication device 104 and then transmitted for storage in the hands-free device's memory 112 via the short range wireless link 132. Personalized messages may be associated in the memory 112 with the stored contact information 121. For example, one or more separate personalized messages may be stored for each contact (e.g., the personalized message "HI HONEY. I'M IN A MEETING RIGHT NOW, BUT GIVE ME A MINUTE TO STEP OUT SO I CAN TALK." may be stored and associated with the user's spouse) or one or more personalized messages may be stored for use with all contacts (e.g., the message "HI. THANKS FOR CALLING. I'M IN A MEETING RIGHT NOW, BUT WOULD LIKE TO SPEAK TO YOU. PLEASE GIVE ME A MINUTE SO I CAN STEP OUT."). Additionally, personalized messages for international contacts may be created and stored in applicable foreign languages.

Non-personalized messages may be pre-recorded by someone or something (e.g., a voice synthesizer) other than the system user and stored in the memory 112 at the time of manufacture of the hands-free device 102. In other words, non-personalized messages are not recorded by the user and may be canned or standard messages (e.g., the message "HI. I'M IN A MEETING RIGHT NOW, BUT WOULD LIKE TO SPEAK TO YOU. PLEASE HOLD FOR A MINUTE SO I CAN STEP OUT."). Non-personalized messages may be used for calling parties that do have contact information stored in the memory 112. Although not recorded by the system user, non-personalized messages may be tailored to the needs of the calling party in that they may be in multiple languages.

When the stored audio messages 120 include personalized messages, the processing device 110 determines whether the calling party ID information contained in the incoming call information matches any of the stored contact information 121. If a match occurs, the processing device 110 retrieves the appropriate personalized message from the memory 112, encodes and otherwise processes it in accordance with the BLUETOOTH protocol, and forwards it to the transceiver 108 for transmission to the mobile device 104 over the short-range wireless link 132. If a match does not occur, the processing device 110 retrieves an appropriate non-personalized message from the memory 112, encodes and otherwise processes it in accordance with the BLUETOOTH protocol, and forwards it to the transceiver 108 for transmission to the mobile device 104 over the short-range wireless link 132. Alternatively, for a more personal touch, a standardized message personally recorded by the system user may be stored in the pre-recorded audio messages component 120 of the memory 112 and used in situations where the calling party ID information does not match any of the contact information 121.

In one embodiment, when no contact match occurs, the processing device 110 may analyze the calling party ID information (e.g., examine the country calling code) to determine whether the incoming call originated from a non-English speaking country. If the incoming call originated from a non-English speaking country, the processing device 110 may then retrieve from the memory 112 a non-personalized message in a language used by the country from which the incoming call originated. For example, the memory 112 may include a database or look-up table mapping the country calling code to one or more languages for use in generating the non-personalized message or to one or more pre-recorded non-English audio messages 120 stored in the memory 112.

In a further embodiment, the processing device 110 may alternate between English and non-English messages to play a message in two languages. This could be done for all incoming calls or may be based upon calling party ID. For example, the system user may set English as the default language, but the processing device 110 may be programmed to switch between English and Mandarin when receiving a call from China.

In a further embodiment, the processing device 110 may be programmed to monitor the length of time during which the hands-free device 102 is in the delayed answering mode, in this case, the processing device 110 may retrieve and forward one message upon detecting activation of the delayed answering mode and one or more other messages during the remainder of the delayed answering mode period. The subsequent message or messages may remind the calling party that the system user is still interested in speaking to the caller. For example, responsive to detecting activation of the delayed answering mode, the processing device 110 may retrieve a message such as those described above. The processing device 110 may then monitor the amount of time that has passed (e.g., through activation of a timer) and, if the delayed answering mode has not been deactivated within a predetermined period of time (e.g., ten (10) to twenty (20) seconds), retrieve and forward an update message, such as "I HAVEN'T FORGOT ABOUT YOU, BUT I AM STILL OCCUPIED. I'LL BE WITH YOU IN A MOMENT." After forwarding the update message, the processing device 110 may restart its timer and again retrieve and send the update message or another message after detecting expiration of the timer without detecting deactivation of the delayed answering mode.

In one embodiment, the short-range wireless link 132 is a full duplex link. In this embodiment, the system user may continue to hear all statements made by the calling party during the time period that the pre-recorded audio message is being communicated to the calling party. For example, the processing device 110 may be programmed or otherwise operable to mute the microphone 118 during the delayed answering mode and contemporaneously provide audio received from the mobile device 104 over the full duplex link to the speaker 116 so that the user can listen to the calling party's response without the hands-free device 102 communicating any sounds made by the user or the background setting in which the user presently resides.

Upon receiving the audio packets containing the pre-recorded audio message from the hands-free device 102, the mobile device 104 processes the message as if it was audio information supplied by the user via the speaker 116. For example, when the BLUETOOTH protocol is used as the shorter-range wireless protocol, a BLUETOOTH synchronous connection oriented (SCO) link, an enhanced SCO (eSCO) link, an asynchronous, bi-directional audio link, or any other audio link is established between the hands-free device 102 and the mobile device 104 responsive to user activation of the delayed answering mode. Thus, the mobile device 104 simply communicates normally with the hands-free device 102 and cannot distinguish between normal operation of the hands-free device 102 and operation of the hands-free device 102 in the delayed answering mode. The voice packets received over the SCO link are processed normally by the mobile device's processing device 126 and transmitted over the WWAN link 134. Since mobile device operation remains unchanged during delayed answering mode operation by the hands-free device 102, a hands-free device 102 operating in accordance with the present invention can be used with any mobile device 104 that supports the shorter-range protocol implemented in the hands-free device 102.

After the user has become unoccupied and elects to deactivate the delayed answering mode (e.g., by releasing the call answering button 206, re-pressing the call answering button 206, or otherwise deactivating the delayed answering mode actuator 114), the hands-free device's processing device 110 detects deactivation of the delayed answering mode, ceases processing of the pre-recorded messages 120, unmutes the microphone 118 and processes the sound detected by the microphone 118 instead of the pre-recorded messages 120. The processed sound is provided to the transceiver 108 for transmission over the short-range wireless link 132 in accordance with the shorter-range wireless protocol. Alternatively, the hands-free device's processing device 110 may alert that user and/or the calling party as to the deactivation of the delayed answering mode by sounding a "beep" or a tone or playing another pre-recorded message (e.g., the message "THANKS FOR WAITING, AFTER THE BEEP I'LL BE READY TO TALK").

In one embodiment, the state machine for the delayed answering mode includes three states. According to this embodiment, recording of personalized messages can only be performed when the state machine, which may be implemented in the hands-free device's processing device 110, is in a standby state. When a recording event is detected (e.g., a separate recording button is depressed or the call answering button 206 is depressed in a predetermined manner), the state machine moves to a recording state, turns the microphone 118 on and turns the speaker 116 off. Upon the end of the recording event, the state machine returns to a null state. The retrieval and playback of a pre-recorded outgoing message 120 is possible when the state machine is in the standby state. For example, when the state machine is in the standby state, the hands-free device user may scroll through the pre-recorded messages using the volume keys (not shown) of the hands-free device 102. Upon detecting user activation of the delayed answering mode (e.g., by detecting depression of a dedicated delayed answer button or detecting that the call answering button 206 is depressed in a predetermined manner), the state machine enters a playback state and retrieves one of the pre-recorded messages 120. The state machine then enters a connection state in which the retrieved message 120 is sent to the transceiver 108 for transmission over the short-range wireless link 132.

By implementing a delayed answering feature in a wireless hands-free device, the present invention solves the problem of being able to delay answering of a wireless phone call when a user is in a meeting or otherwise occupied. The hands-free device acts as a virtual receptionist by answering the call and putting the caller on virtual hold while the user moves to a location where he or she can take the call or until the user can reach their phone. In other words, the hands-free device operates as a wireless client device that can "trick" the phone into answering the call through a standard hands-free profile command (e.g., when BLUETOOTH is used as the shorter-range wireless protocol) while providing the user time to become unoccupied. Additionally, by implementing the delayed answering feature and storing pre-recorded messages in the hands-free device instead of the mobile device, the present invention facilitates use of the delayed answering feature with any mobile devices that support the shorter-range protocol (e.g., BLUETOOTH) implemented in the hands-free device. Consequently, the present invention would allow a user to utilize the delayed answering feature even if the user had to borrow or rent a mobile device (e.g., while traveling) so long as the borrowed or rented device supported the shorter-range wireless protocol implemented in the hands-free device (e.g., was BLUETOOTH-capable).

FIG. 3 is a flow diagram 300 of steps executed by a wireless hands-free device to facilitate delayed answering of an incoming call in accordance with an exemplary embodiment of the present invention. According to the exemplary flow diagram 300, the hands-free device connects (302) to a mobile communication device according to a shorter-range wireless protocol, such as the BLUETOOTH protocol, implemented in both the hands-free device and the mobile communication device. Connection between the hands-free device and the mobile communication device may occur automatically over a short-range wireless link upon power up of both devices in accordance with the shorter-range wireless protocol.

Some time after the hands-free device and the mobile communication device have been wirelessly connected, the hands-free device receives (304) incoming calling information from the mobile device over a short-range wireless link. The incoming calling information may include calling party ID information, such as a telephone number, from which the hands-free device can determine who is calling. In such a case, the hands-free device may audibly provide an identity of the calling party to the hands-free device user via a speaker of the hands-free device as an audible caller ID. The audible caller ID may be provided through comparison of the calling party ID information to pre-stored contact information, and then retrieval of a pre-stored voice identity for the calling party (e.g., "SIS," "HOME," "MOM," and so forth) or text-to-speech generation of a portion of the stored contact information (e.g., the name of the contact). Alternatively, when the calling party ID information does not match a stored contact, the hands-free device may audibly provide the telephone number of the caller to the hands-free device user through use of a text-to-speech converter.

After receiving the incoming call information and optionally providing an audible caller ID to the user, the hands-free device detects (306) whether the call has been accepted and whether the user has activated (308) the delayed answering mode. If the call is accepted and the delayed answering mode has not been activated, the call proceeds (310) in a conventional manner with the microphone unmuted. On the other hand, if the call is accepted and the delayed answering mode has been activated (e.g., by the user's pressing of a call answer button in a predetermined manner corresponding to activation of the delayed answering mode), the hands-free device mutes (311) the microphone and determines (312) whether the calling party ID information matches stored contact information.

If the calling party ID information matches stored contact information, the hands-free device retrieves (314) a personalized outgoing message stored in memory and transmits (316) the retrieved message to the mobile communication device over the short-range wireless link. As described above, the message may inform the calling party that the user is occupied and will be answering the call shortly. The hands-free device regularly monitors (318) for an indication that the delayed answering mode has ended or been deactivated (e.g., by the user's pressing of a call answer button in a predetermined manner corresponding to deactivation of the delayed answering mode). The hands-free device may periodically retransmit the personalized message or another personalized or non-personalized message during the delayed answer period. Responsive to detecting termination or deactivation of the delayed answering mode, the hands-free device unmutes (319) the microphone and continues (310) the call.

If the calling party ID information does not match, stored contact information, the hands-free device retrieves (320) a standard or non-personalized outgoing message stored in memory and transmits (322) the retrieved message to the mobile communication device over the short-range wireless link. As described above, the message may inform the calling party that the user is occupied and will be answering the call shortly. The hands-free device regularly monitors (324) for an indication that the delayed answering mode has ended or has been deactivated. The hands-free device may periodically retransmit the message or another personalized or non-personalized message during the delayed answer period. Responsive to detecting termination or deactivation of the delayed answering mode, the hands-free device unmutes (319) the microphone and continues (310) the call.

In an alternative embodiment, the hands-free device may not store contact information and, therefore, may not compare the calling party ID information to stored contact information. In such a case, upon detecting activation of the delayed answering mode, the hands-free device retrieves a pre-recorded, personalized or non-personalized, audio message from memory and transmits the retrieved message to the mobile communication device over the short-range wireless link. Transmission of the pre-recorded message or another message may be repeated until termination or deactivation of the delayed answering mode.

The present invention encompasses an apparatus and method for facilitating delayed answering of an incoming call. When a call is received by a mobile device that is wirelessly coupled to a hands-free accessory, such as a headset, the call is answered with a pre-recorded outgoing message responsive to the user's activation of a delayed answering mode (e.g., when a button on the headset is pressed and held (instead of pressed and released)). The pre-recorded message informs the caller as to the status of the user and may make the caller aware of the user's intention to personally answer the call in a short period of time. The message may be periodically repeated until the delayed answering mode is deactivated (e.g., the previously held button is released). When the delayed answering mode is deactivated, the audio path is switched from the pre-recorded audio file to the uplink audio from the microphone of the hands-free accessory. Optionally, the conversation can be continued using the mobile communication device instead of the hands-free accessory. With this invention, hands-free device users can accept an incoming call, but defer speaking until the user moves to a location more conducive to voice conversations or otherwise becomes unoccupied. Additionally, by implementing a delayed answering mode and storing pre-recorded messages in the hands-free device, the delayed answering mode can be used with any mobile devices that support the shorter-range wireless protocol of the hands-free device.

As detailed above, embodiments of the present invention reside primarily in combinations of method steps and apparatus components related to facilitating delayed answering of an incoming call when using a hands-free device. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as "first" and "second," "top" and "bottom," and the like may be used solely to distinguish one entity or action from another entity or action without necessarily requiring or implying any actual such relationship or order between such entities or actions. The terms "comprises," "comprising," and any other variation thereof are intended to cover a non-exclusive inclusion, such that a process, method, article, or apparatus that comprises a list of elements does not include only those elements but may include other elements not expressly listed or inherent to such process, method, article, or apparatus. The term "plurality of" as used in connection with any object or action means two or more of such object or action. A claim element proceeded by the article "a" or "an" does not, without more constraints, preclude the existence of additional identical elements in the process, method, article, or apparatus that includes the element.

It will be appreciated that embodiments of the wireless hands-free device 102 and the mobile communication device 104 described herein may be comprised of one or more conventional processors and unique stored program instructions that control the processor(s) to implement, in conjunction with certain non-processor circuits, some, most, or all of the functions of the wireless hands-free device 102 and the mobile communication device 104 and their operational methods as described herein. The non-processor circuits may include, but are not limited to, the transceivers 108, 124, 128, antennas 106, 122, 130, speaker 116, microphone 118, memory 112, and delayed answering mode actuator 114 described above, as well as filters, signal drivers, clock circuits, power source circuits, user input devices, an various other non-processor circuits. As such, the functions of these non-processor circuits may be interpreted as steps of a method to facilitate delayed answering of an incoming call. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been generally described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions or programs and integrated circuits without undue experimentation.

In the foregoing specification, specific embodiments of the present invention have been described. However, one of ordinary skill in the art will appreciate that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

We claim:

1. A wireless hands-free device operable to communicate with a mobile communication device over a short-range wireless link, the short-range wireless link providing wireless communications over a range of approximately one hundred meters or less, the mobile communication device facilitating communications over a wireless wide area network, the wireless hands-free device comprising:

a transceiver operable to at least receive incoming call information from the mobile communication device over the short-range wireless link, the incoming call information corresponding to an incoming call received by the mobile communication device over the wireless wide area network;

a memory operable to store one or more pre-recorded audio messages;

a delayed answering mode actuator activatable by a user of the wireless hands-free device; and a processing device operably coupled to the transceiver, the memory, and the delayed answering mode actuator, the processing device operable to:

detect activation of the delayed answering mode actuator after receipt of the incoming call information;

retrieve at least one pre-recorded audio message from the memory responsive to detecting activation of the delayed answering mode actuator; and provide the at least one pre-recorded audio message to the transceiver for subsequent transmission to the mobile communication device over the short-range wireless link.

2. The wireless hands-free device of claim 1, wherein the delayed answering mode actuator comprises a manually actuatable switch and wherein the processing device detects activation of the delayed answering mode actuator by detecting actuation of the switch in a predetermined manner.

3. The wireless hands-free device of claim 2, wherein the switch enables the user to answer the incoming call and wherein the predetermined manner is at least one of press and hold for a first predetermined period of time, press and release a first predetermined number of times, and press and release a second predetermined number of times and then hold on a last press for a second predetermined period of time.

4. The wireless hands-free device of claim 1, wherein the one or more pre-recorded audio messages include a plurality of pre-recorded audio messages, wherein the incoming-call information includes calling party identification information, and wherein the processing device is further operable to select the at least one pre-recorded audio message from the plurality of pre-recorded audio messages based on the calling party identification information.

5. The wireless hands-free device of claim 4, wherein the at least one pre-recorded audio message includes a first pre-recorded audio message and a second pre-recorded audio message, and wherein the processing device is further operable to initially provide the first pre-recorded audio message and subsequently provide the second pre-recorded audio message to the transceiver for transmission to the mobile communication device over the short-range wireless link while the wireless hands-free device is in a delayed answering mode of operation.

6. The wireless hands-free device of claim 4, wherein the calling party identification information includes information identifying a country from which the incoming call originated, wherein the plurality of pre-recorded audio messages includes audio messages in a plurality of languages, and wherein the processing device is further operable to select the at least one pre-recorded audio message from the plurality of pre-recorded audio messages such that the at least one pre-recorded audio message is in a language used by the country from which the incoming call originated.

7. The wireless hands-free device of claim 4, wherein the memory is further operable to store user-defined contact information, wherein the plurality of pre-recorded audio messages includes at least one personalized audio message recorded by the user and at least one non-personalized audio message not recorded by the user, and wherein the processing device is further operable to select the at least one personalized audio message to retrieve from the memory when the calling party identification information corresponds to an entry of the user-defined contact information.

8. The wireless hands-free device of claim 7, wherein the user-defined contact information comprises at least one telephone number.

9. The wireless hands-free device of claim 1, further comprising:

a speaker operably coupled to the processing device, wherein the processing device is further operable to process audio information present in the incoming call information into a format deliverable by the speaker and wherein the speaker is operable to audibly deliver the audio information to the user.

10. The wireless hands-free device of claim 9, wherein the incoming call information includes calling party identification information, wherein the processing device is further operable to process the calling party identification information into the format deliverable by the speaker, and wherein the speaker is further operable to audibly deliver the calling party identification information to the user.

11. The wireless hands-free device of claim 1, further comprising:

a microphone operably coupled to the processing device, the microphone being operable to detect sound produced by the user, wherein the processing device is further operable to mute the sound detected by the microphone responsive to detecting activation of the delayed answering mode actuator.

12. The wireless hands-free device of claim 11, wherein the processing device is further operable to process the sound detected by the microphone, to detect de-activation of the delayed answering mode actuator, and to provide the processed sound to the transceiver for subsequent transmission to the mobile communication device over the short-range wireless link responsive to detecting de-activation of the delayed answering mode actuator.

13. A system for providing delayed answering of an incoming call communicated over a wireless wide area network, the system comprising:

a mobile communication device that includes:
  a first transceiver operable to receive the incoming call from the wireless wide area network;
  a first processing device operably coupled to the first transceiver, the first processing device operable to process the incoming call and generate incoming call information based thereon; and
  a second transceiver operably coupled to the first processing device and operable to transmit the incoming call information over a short-range wireless link, the short-range wireless link providing wireless communications over a range of approximately one hundred meters or less; and a wireless hands-free device that includes:
  a third transceiver operable to at least receive the incoming call information from the second transceiver over the short-range wireless link;
  a memory operable to store one or more pre-recorded audio messages;
  a delayed answering mode actuator activatable by a user of the wireless hands-free device; and
  a second processing device operably coupled to the third transceiver, the memory, and the delayed answering mode actuator, the second processing device operable to:
    detect activation of the delayed answering mode actuator after receipt of the incoming call information;
    retrieve at least one pre-recorded audio message from the memory responsive to detecting activation of the delayed answering mode actuator; and
    provide the at least one pre-recorded audio message to the third transceiver for subsequent transmission to the second transceiver over the short-range wireless link.

14. The system of claim 13, wherein the one or more pre-recorded audio messages include a plurality of pre-recorded audio messages, wherein the incoming call information includes calling party identification information, and wherein the second processing device is further operable to select the at least one pre-recorded audio message from the plurality of pre-recorded audio messages based on the calling party identification information.

15. The system of claim 14, wherein the calling party identification information includes information identifying a country from which the incoming call originated, wherein the plurality of pre-recorded audio messages includes audio messages in a plurality of languages, and wherein the second processing device is further operable to select the at least one pre-recorded audio message from the plurality of pre-recorded audio messages such that the pre-recorded audio message is in a language used by the country from which the incoming call originated.

16. The system of claim 14, wherein the memory is further operable to store user-defined contact information, wherein the plurality of pre-recorded audio messages includes at least one personalized audio message recorded by the user and at least one non-personalized audio message not recorded by the user, and wherein the second processing device is further operable to select the at least one personalized audio message to retrieve from the memory when the calling party identification information corresponds to an entry of the user-defined contact information.

17. The system of claim 13, wherein the incoming call information includes calling party identification information, the system further comprising:
 a speaker operably coupled to the second processing device,
 wherein the second processing device is further operable to process the calling party identification information into a format deliverable by the speaker, and wherein the speaker is operable to audibly deliver the calling party identification information to the user.

18. The system of claim 13, further comprising:
 a microphone operably coupled to the second processing device, the microphone operable to detect sound produced by the user, wherein the second processing device is further operable to mute sound detected by the microphone responsive to detecting activation of the delayed answering mode actuator.

19. The system of claim 13, wherein the wireless hands-free device is a wireless headset.

20. A method for a wireless hands-free device to facilitate delayed answering of an incoming call received by a mobile communication device over a wireless wide area network, the wireless hands-free device communicating with the mobile communication device over a short-range wireless link, the short-range wireless link providing wireless communications over a range of approximately one hundred meters or less, the method comprising:
 storing one or more pre-recorded audio messages in memory;
 receiving incoming call information from the mobile communication device over the short-range wireless link, the incoming call information corresponding to the incoming call;
 detecting activation of a delayed answering mode after receipt of the incoming call information;
 retrieving at least one pre-recorded audio message from the memory responsive to detecting activation of the delayed answering mode; and
 transmitting the at least one pre-recorded audio message to the mobile communication device over the short-range wireless link during the delayed answering mode.

21. The method of claim 20, wherein the wireless hands-free device includes a speaker and a microphone and wherein the short-range wireless link is a full duplex link, the method further comprising:
 muting the microphone during the delayed answering mode; and
 contemporaneously providing audio received from the mobile communication device over the full duplex link to the speaker to allow a user of the wireless hands-free device to listen to statements made by a party who made the incoming call.

* * * * *